Patented Dec. 20, 1932

1,891,476

UNITED STATES PATENT OFFICE

CHARLES L. KELLER, OF CINCINNATI, OHIO, ASSIGNOR TO THE RICHARDSON COMPANY, OF LOCKLAND, OHIO, A CORPORATION OF OHIO

MOLDING PROCESS

No Drawing.  Application filed July 2, 1928. Serial No. 290,035.

My invention is related to the molding of articles from plastic substances in preformed pieces.

Molding processes may be said generally to fall into two classes with reference to the nature of the mold charge. In the first class, the mold charge is merely approximate, gauged by the operator to be more or less greater than the amount of plastic material to form the article itself; and in this class the mold will be provided with means for taking care of the overflow, which frequently is allowed to form fins. In the second class, usually having to do with the high pressure molding of dense plastics under long draw, the mold has no provision for overflow, and the quantity of the mold charge must be accurately gauged by the operator. This is done by hand weighing, and is inconvenient, costly and time-consuming.

A number of proposals have been made looking toward a solution of this difficulty. One of them is to preform the material into pellets or masses of a given weight in a supplementary molding operation. Another has been to extrude the material into sheet-like forms and cut out pieces of a definite size. Both operations involve some difficulty.

Even in the first class of molding practice to which I have referred, the problem of handling the material is important. Mold charges, whether accurate or not, must be formed in some manner, and where the molding operations are automatic or semi-automatic in character and mold charges must be prepared with great rapidity, a supplementary molding operation is frequently resorted to.

It is an object of my invention to provide a plastic material in a new form suitable for molding operations of either type, a form which is convenient in handling and which permits the use of very rapid automatic molding operations.

I form sheets of plastic composition on a screen in an operation similar to paper making and in such a fashion that I can gauge very accurately the caliper of the sheets. My sheets may, and where I desire thin ones, will be formed on an ordinary paper machine of the Fourdrinier or cylinder mold type; but where I desire thicker sheets, I prefer to use a device similar to an Oliver continuous board machine. I prefer this device because it delivers thick sheets without laminations.

Another way, however, of making thick sheets is to form a thin sheet on a screen or cylinder mold from which it is continuously removed by a felt, and then to pick the sheet off the felt onto a pressure roll, permitting it to accumulate there by winding, stripping it from the pressure roll when a sheet of the desired thickness has been obtained, and repeating the process for successive sheets. The essential character of this step of my process is that it gives me sheets very accurate as to caliper and very uniform as to composition. This is in part a function of the manner of forming the sheets, but it is also a function of the pulp from which the sheets are formed, and a preferred type of this pulp I shall now describe.

It has been found by Harry C. Fisher, as described and claimed by him in application for United States Letter Patent Serial No. 314,551, filed October 23, 1928, the teaching of which antedates my disclosure, that it is possible to manufacture a plastic and moldable composition of bitumen and fibers and then bring this composition into a water suspension wherein it assumes the form of a fibrous pulp suitable for sheeting on a screen. To make such a pulp I place in a mixer a quantity of bituminous material such as asphalt, and I add thereto a quantity of fiber, preferably of vegetable origin and preferably wet. Heat is applied to the bituminous material to bring it into a gummy condition, and the mixing is preferably conducted while the asphalt is in this condition. I mean by a gummy condition, a condition of the asphalt in which it is strongly adherent to the fibrous masses, and more extensible than they, whereby when a mixing operation of a type involving a repeated extension of the mixer charge is carried on, the fibrous aggregate will be broken down into individualized fibers through the combined action of the mechanical mixing and the pulling and extending action of the gummy asphalt, and whereby these fibers will be distributed homogeneously throughout the mass of binder and refelted together therein. This is a process described and claimed in the patent to James C. Woodley, No. 1,156,122, dated October 12, 1915.

In forming my pulp, where a hard asphaltic material is desirable, I prefer to use one which will assume the gummy condition I have described at a temperature not substantially in excess of 212° F. This is because I prefer to introduce my fibrous material into the mixer in a moistened condition. The moisture will be driven off from the mixing mass under the influence of heat in the mixer; but while any substantial degree of moisture remains, it will be clear that the temperature of the mass will not substantially exceed the boiling point of water. I continue the mixing until a fair degree of homogeneity is obtained, and I then introduce into the mixer an excess of water and continue the mixing operation. The mixed mass thereupon begins to break down and form a type of suspension in the liquid vehicle. This action may in some instances be facilitated by the use of a lubricating agent as described in the co-pending application above referred to.

When the mass has substantially been broken down into small particles in suspension or semi-suspension, so that the resultant product is easy to remove from the mixer, I pour it out and introduce it into a beating engine, preferably of the Hollander type, in which I proceed to beat it as I would ordinary paper stock. I may at this point, if desired, add a quantity of fibrous material not in association with asphalt, or I may add filler materials or both. The result of the beating gives me a freely flowing pulp of asphaltic character, which is characterized by the fact that the asphalt and the fibers are in the pulp in intimate association. The pulp is not comparable to a paper pulp in which particles of asphalt have merely been suspended.

Another way of making a true bituminous pulp is described and claimed in the copending application of Earl P. Stevenson and Harry A. Buron, Serial No. 316,611, filed November 1, 1928. The teaching of this application antedates my disclosure.

By the mixing opertion referred to above, the asphalt is given a fibrous character, and in the pulping operation this character does not seem to be lost, so that in the finished pulp there exists a definite interrelationship between the bitumen and the fibrous constituents such as is not destroyed upon standing. The proportions of the ingredients will vary according to the uses for which the finished material is designed; and I can vary the characteristics of the utimate molded product through very wide limits by varying these proportions and by varying the kind and quality of the bituminous, fibrous and filler ingredients. My invention is not restricted to any specific type of composition.

I may, if desired, refine my pulp further by passing it through a Jordan engine or other refining device before it is delivered to the stuff chests of a forming machine. I then proceed to form it up on a screen as I have hereinbefore described; and I obtain thereby very uniform sheets of a felted product which is nevertheless a thoroughly heat plastic product and is capable of flowing under heat and pressure in molds even of a deep draw.

Finished and dried sheets of plastic composition formed in this manner may be cut into mold charges in which it will be found that the size of the cut very accurately gauges the weight of the charge. Either before or after cutting, it may be stored and/or shipped and held ready for use in a molding operation which may be considerably delayed as to time.

When it is desired to mold the product, it may be warmed so as to bring the binder into a more or less plastic condition. Then if it is in sheet form, it may be cut into mold charges, or if already in mold charges, delivered directly to the molds. If the material itself is sufficiently plasticized by heat, it may be molded in cold molds, and this is the process I ordinarily prefer. The press dwell is not excessive because the setting up of the material is quicker, and it is not difficult to heat the preformed charges sufficiently so that they operate very well in cold molds. A hot molding operation may, however, be valuable where the material is under-plasticized; and in any event a molding operation in a hot mold will usually give a somewhat different type of surface finish.

Sheets of plastic material formed as I have described are readily workable in hot dies to any desired configuration, and my process is not restricted to the use of preformed mold charges made by a cutting or stamping operation. Automatic hot dies working on sheets of the plastic can be used to form very rapidly a series of articles interconnected by webs or fins which may subsequently be removed, and in such an operation the usefulness of my process is particularly apparent in that I am able to work with dies upon a very accurately gauged sheet.

I can thus take the pulp I have described, sheet it out as explained, and hot mold therefrom shapes more easily and cheaply than can be done by pulp blowing or vacuum pulp molding operations working directly with the pulp. One reason for this is that a die forming operation working on a heat plastic substance is quicker, bulk for bulk of the article produced, than a pulp forming process involving at least a partial drying before the article can be removed from the mold. In addition in die forming operations I secure the hardening effect and the surface finish produced by pressure against mold surfaces.

Where a single thickness of a sheet cut to shape is not satisfactory for a mold charge, I have found it possible to form a mold charge by the superposition of sheets. In molding articles in which the thickness of the material varies widely in different areas, I may build up in one mold section a charge comprising a number of sheets cut to various shapes so that initially the thickness of the charge is greater in those parts of the mold where the article itself is to be thicker, and I can consolidate the superposed sheets together under the action of heat and pressure.

My invention is not confined to molding between dies, but is susceptible to other forming operations while the material is still plastic, such as operations analogous to rolling, spinning, turning and the like.

Having thus described my invention, what I claim as new and desire to secure by Letters Patent is:—

1. That process of manufacturing articles of plastic composition comprising bringing a binder material and a fibrous material into intimate association, dispersing said associated materials in a liquid vehicle to form a pulp thereof, forming a sheet of said pulp upon a screen, drying said sheet, cutting a mold charge from said sheet, plasticizing said mold charge and molding it into a finished article by causing it to flow under pressure and fill a mold cavity.

2. That process of forming articles of plastic composition comprising bringing asphalt and fibrous material into intimate association, dispersing said associated materials in water to form a pulp thereof, sheeting said pulp upon a screen, drying said sheeted pulp and molding articles therefrom by plasticizing said sheeted pulp under heat, and by causing it under pressure to flow and fill a mold cavity.

3. That process of forming articles of plastic composition comprising bringing asphalt and fibrous material into intimate association, dispersing said associated material in water to form a pulp thereof in which said asphalt exists in minute uncoated particles in stable association with said fibrous materials, sheeting said pulp upon a screen, drying said sheeted pulp, cutting a mold charge from said sheeted pulp, heating said mold charge and molding it to a finished article.

4. That process of manufacturing articles of plastic composition comprising bringing a binder material and a fibrous material into intimate association, dispersing said associated materials in a liquid vehicle to form a pulp thereof, forming up said pulp upon a screen, drying said formed up pulp and molding articles therefrom by plasticizing said formed up pulp under heat and by causing it, under pressure, to flow and fill a mold cavity.

CHARLES L. KELLER.